US009835888B2

(12) United States Patent
Sato et al.

(10) Patent No.: US 9,835,888 B2
(45) Date of Patent: Dec. 5, 2017

(54) CONNECTING A LIQUID CRYSTAL DISPLAY TO A CIRCUIT BOARD USING A FLEXIBLE CIRCUIT BOARD

(71) Applicant: PANASONIC LIQUID CRYSTAL DISPLAY CO., LTD., Hyogo (JP)

(72) Inventors: Takeki Sato, Osaka (JP); Masaki Tsubokura, Osaka (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 509 days.

(21) Appl. No.: 14/199,592

(22) Filed: Mar. 6, 2014

(65) Prior Publication Data

US 2014/0184954 A1    Jul. 3, 2014

Related U.S. Application Data

(63) Continuation of application No. PCT/JP2013/005683, filed on Sep. 25, 2013.

(30) Foreign Application Priority Data

Nov. 6, 2012   (JP) .................................. 2012-244100

(51) Int. Cl.
*G02F 1/1345* (2006.01)
*G02F 1/1333* (2006.01)

(52) U.S. Cl.
CPC .... *G02F 1/133305* (2013.01); *G02F 1/13338* (2013.01); *G02F 1/13452* (2013.01); *G02F 2202/28* (2013.01)

(58) Field of Classification Search
CPC ...................... G02F 1/133308; G02F 1/13338
USPC .................... 349/149–152, 12; 345/173, 174
See application file for complete search history.

(56) References Cited

U.S. PATENT DOCUMENTS

| 5,442,470 A | 8/1995 | Hashimoto |
| 5,528,403 A * | 6/1996 | Kawaguchi ......... G02F 1/13452 349/149 |
| 5,838,412 A | 11/1998 | Ueda et al. |
| 6,144,216 A * | 11/2000 | Kajiwara ............... G09G 3/006 324/73.1 |

(Continued)

FOREIGN PATENT DOCUMENTS

| JP | H05-341306 A | 12/1993 |
| JP | 07-013144 A | 1/1995 |

(Continued)

*Primary Examiner* — Edward Glick
*Assistant Examiner* — David Chung
(74) *Attorney, Agent, or Firm* — McDermott Will & Emery LLP

(57) ABSTRACT

The instant application describes a liquid crystal display device comprising: a liquid crystal display; a circuit board including a top surface, a bottom surface, and a drive circuit for driving the liquid crystal display; and a flexible circuit board for connecting the liquid crystal display and the circuit board to each other. The flexible circuit board includes a first end connected to the liquid crystal display and a second end connected to the bottom surface of the circuit board. The flexible circuit board is configured to wrap around the circuit board, covering the top surface and the bottom surface of the circuit board. The top surface of the circuit board is fixed to the flexible circuit board.

4 Claims, 18 Drawing Sheets

(56) References Cited

U.S. PATENT DOCUMENTS

| | | | | |
|---|---|---|---|---|
| 6,639,589 B1* | 10/2003 | Kim | ............... | G02F 1/13452 345/102 |
| 2004/0165138 A1* | 8/2004 | Hwang | ............... | G02F 1/13452 349/152 |
| 2005/0280635 A1* | 12/2005 | Hinata | ............... | G02F 1/1333 345/173 |
| 2007/0091242 A1* | 4/2007 | Oohira | ............... | G02F 1/133615 349/149 |
| 2008/0007538 A1* | 1/2008 | Kotera | ............... | G06F 3/0412 345/173 |
| 2008/0030668 A1* | 2/2008 | Komaju | ............... | G02F 1/1345 349/151 |
| 2009/0086114 A1* | 4/2009 | Higuchi | ............... | G02F 1/13338 349/12 |
| 2009/0213089 A1* | 8/2009 | Hwang | ............... | G06F 3/0412 345/174 |
| 2009/0284484 A1* | 11/2009 | Hwang | ............... | G06F 3/0416 345/173 |
| 2010/0060601 A1* | 3/2010 | Oohira | ............... | G02F 1/133308 345/173 |
| 2011/0227846 A1* | 9/2011 | Imazeki | ............... | G06F 3/044 345/173 |
| 2012/0098774 A1 | 4/2012 | Abe et al. | | |
| 2012/0127393 A1* | 5/2012 | Hamada | ............... | G09F 9/35 349/58 |
| 2012/0314383 A1* | 12/2012 | Oohira | ............... | G02F 1/13452 361/749 |

FOREIGN PATENT DOCUMENTS

| | | |
|---|---|---|
| JP | 07-135383 A | 5/1995 |
| JP | H09-138387 A | 5/1997 |
| JP | 2006-078622 A | 3/2006 |
| JP | 2007-292901 A | 11/2007 |
| JP | 2012-093498 A | 5/2012 |

* cited by examiner

CONNECTING A LIQUID CRYSTAL DISPLAY TO A CIRCUIT BOARD USING A FLEXIBLE CIRCUIT BOARD

CROSS-REFERENCE TO RELATED APPLICATION

This application is Bypass Continuation of international patent application PCT/JP2013/005683, filed: Sep. 25, 2013 designating the United States of America, the entire disclosure of which is incorporated herein by reference. Priority is claimed based on Japanese patent application JP2012-244100, filed: Nov. 6, 2012. The entire disclosure of Japanese patent application JP2012-244100 is incorporated herein by reference in its entirety.

TECHNICAL FIELD

The present application relates to a liquid crystal display device and a method of manufacturing a liquid crystal display device.

BACKGROUND

A liquid crystal display device displays an image on a display surface by controlling transmittance and non-transmittance of backlight through a liquid crystal material sealed in a liquid crystal display. A circuit board on which a drive circuit for driving the liquid crystal display is provided is connected to the liquid crystal display via a flexible circuit board (flexible board). In the existing liquid crystal display devices it may be difficult to couple the circuit board to the liquid crystal display. Hence a liquid crystal display device is designed that can make the coupling of the circuit board to the liquid crystal display easier.

SUMMARY

In one general aspect, the instant application describes a liquid crystal display device comprising: a liquid crystal display; a circuit board including a top surface, a bottom surface, and a drive circuit for driving the liquid crystal display; and a flexible circuit board for connecting the liquid crystal display and the circuit board to each other. The flexible circuit board includes a first end connected to the liquid crystal display and a second end connected to the bottom surface of the circuit board. The flexible circuit board is configured to wrap around the circuit board, covering the top surface and the bottom surface of the circuit board. The top surface of the circuit board is fixed to the flexible circuit board.

The above general aspect may include one or more of the following features. For example, the flexible circuit board may be configured to cover a side surface of the circuit board. The liquid crystal display device may further include a touch panel having a top surface and a bottom surface provided to cover a display surface of the liquid crystal display. The flexible circuit board may include a first portion extending along the bottom surface of the touch panel and located between the touch panel and the circuit board, a second portion extending from the first portion and folding away from the bottom surface of the touch panel to wrap around the circuit board, and a third portion extending from the second portion and along the bottom surface of the circuit board.

The circuit board may be separated from the liquid crystal display by a predetermined distance. The liquid crystal display may include a TFT substrate; and a driver IC provided on the TFT substrate. The liquid crystal display device may further include a backlight unit provided on a surface located on an opposite side to a display surface of the liquid crystal display. The top surface of the circuit board may be directly fixed to the flexible circuit board with pressure-sensitive adhesive tape.

The top surface of the circuit board may be directly fixed to the flexible circuit board with double-sided pressure-sensitive adhesive tape. The top surface of the circuit board may be directly fixed to the flexible circuit board with a clip. The top surface of the circuit board may be fixed to the flexible circuit board with solder.

In another general aspect, the instant application describes a liquid crystal display device including a liquid crystal display; a circuit board including a top surface, a bottom surface, and a drive circuit for driving the liquid crystal display; a flexible circuit board for connecting the liquid crystal display and the circuit board to each other; and a touch panel provided to cover a display surface of the liquid crystal display. The flexible circuit board has a first end connected to the liquid crystal display and a second end connected to the bottom surface of the circuit board. The circuit board is fixed to the touch panel. The flexible circuit board is not located between the top surface of the circuit board and the touch panel.

The above general aspect may include one or more of the following features. The flexible circuit board may include a first portion extending along the bottom surface of the touch panel, a second portion extending from the first portion and folding away from the bottom surface of the touch panel, and a third portion extending from the second portion and along the bottom surface of the circuit board.

In another general aspect, the instant application describes a method of manufacturing a liquid crystal display device. The liquid crystal display device includes a liquid crystal display; a circuit board including a top surface, a bottom surface, and a drive circuit for driving the liquid crystal display; a flexible circuit board for connecting the liquid crystal display and the circuit board to each other; a touch panel provided to cover a display surface of the liquid crystal display; and a backlight unit provided on a surface located on an opposite side to the display surface of the liquid crystal display. The flexible circuit board has a first end connected to the liquid crystal display and a second end connected to the bottom surface of the circuit board. The method comprises steps of: folding the flexible circuit board so that a first portion of the flexible circuit board covers the top surface of the circuit board and second portion of the flexible circuit board covers the bottom surface of the circuit board; fixing the top surface of the circuit board to the flexible circuit board; and setting, after the folding step, the backlight unit on the surface located on the opposite side to the display surface of the liquid crystal display.

In another general aspect, the instant application describes a method of manufacturing a liquid crystal display device. The liquid crystal display device includes: a liquid crystal display; a circuit board including a top surface, a bottom surface, and a drive circuit for driving the liquid crystal display; a flexible circuit board for connecting the liquid crystal display and the circuit board to each other; a touch panel provided to cover a display surface of the liquid crystal display; and a backlight unit provided on a surface located on an opposite side to the display surface of the liquid crystal display. The flexible circuit board includes a first end connected to the liquid crystal display and a second end connected to the circuit board. The method includes steps of:

fixing the circuit board to the touch panel without placing the flexible circuit board between the top surface of the circuit board and the touch panel; and setting the backlight unit on the surface located on the opposite side to the display surface of the liquid crystal display.

These general and specific aspects may be implemented using a system, a method, or a computer program, or any combination of systems, methods, and computer programs. Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various systems and methods disclosed herein relate to a liquid crystal display device and a method of manufacturing a liquid crystal display device.

Figure 1:
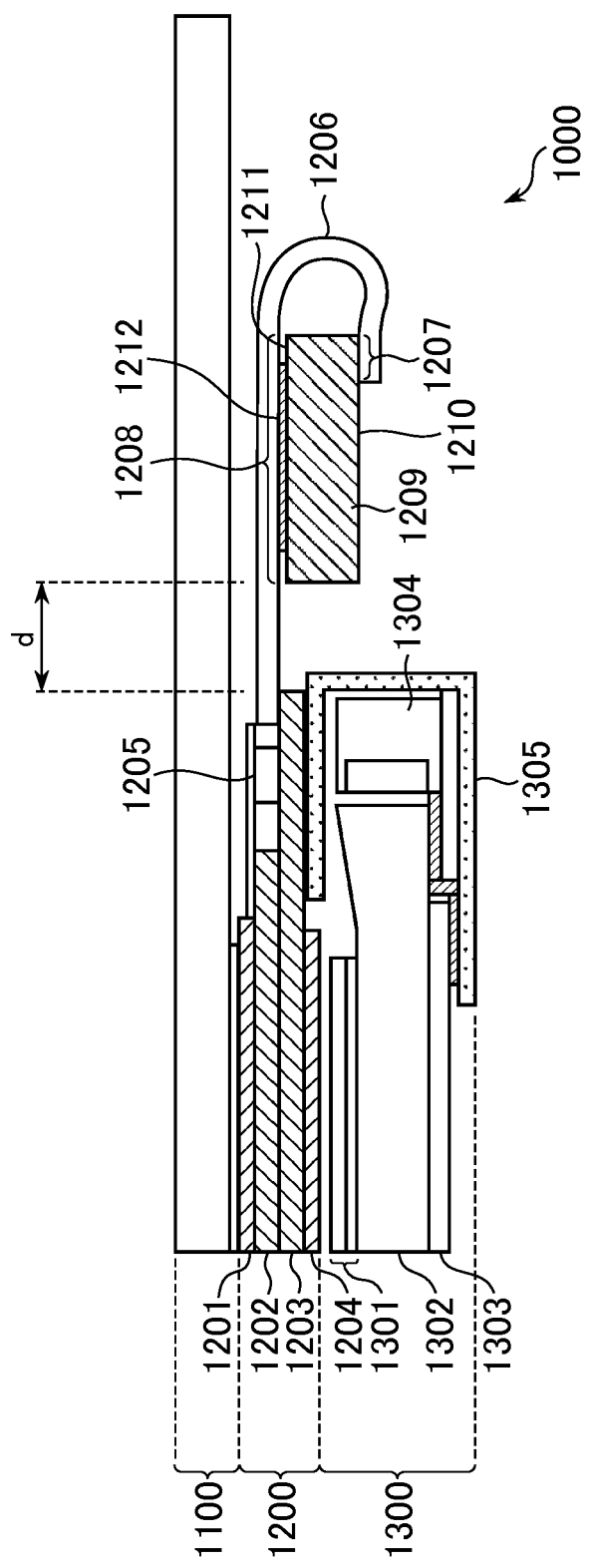
FIG. 1 illustrates an exemplary configuration of a liquid crystal display device of the present application.

FIG. 1 illustrates an exemplary configuration of a liquid crystal display device 1000 of the present application. The liquid crystal display device 1000 includes a touch panel 1100, a liquid crystal display 1200, and a backlight unit 1300. The touch panel 1100 is provided so as to cover a display surface of the liquid crystal display 1200. In one implementation, the touch panel 1100 has an area larger than that of the display surface of the liquid crystal display 1200, and protrudes from the liquid crystal display 1200. The touch panel 1100 detects user's contact (touch operation) to the surface of the touch panel 1100, which is performed in accordance with the display of the liquid crystal display 1200. Based on the detection result, the touch panel 1100 generates an electrical signal and outputs the generated electrical signal to a control section (not shown) or the like of the liquid crystal display device 1000.

The liquid crystal display 1200 includes polarizing plates 1201 and 1204, color filter glass 1202, a TFT substrate 1203, and a driver IC 1205. The driver IC 1205 is provided on the TFT substrate 1203. Examples of a method of mounting the driver IC 1205 include COF (chip on film) and COG (chip on glass). COF refers to mounting of a chip of the driver IC 1205 on a thin film such as a flexible board. When COG is employed as in this implementation, a problem of disconnection may be more easily prevented and the yield may be better than the case of COF.

The backlight unit 1300 includes an optical sheet 1301, a light guide plate 1302, a reflective sheet 1303, a light source 1304, and a frame 1305 made of iron or aluminum. The backlight unit 1300 is provided on a surface of the liquid crystal display 1200 located on the opposite side to the display surface of the liquid crystal display 1200 on which the touch panel 1100 is provided.

The liquid crystal display 1200 and a circuit board 1209 including a drive circuit for driving the liquid crystal display 1200 are connected to each other via a flexible circuit board 1206. The flexible circuit board 1206 includes a first portion 1208, a second portion 1220, and a third portion 1207. The first portion 1208 extends parallel to the bottom surface of the touch panel 1100 and is located between the circuit board 1209 and the touch panel 1100. The second portion 1220 extends from the first portion 1208 and is folded to extend away from the bottom surface of the touch panel 1100. The third portion 1207 extends from the second portion 1220 and extends parallel to the bottom surface 1210 of circuit board 1209. To this end, the flexible circuit board 1206 is configured to wrap around the circuit board 1209, covering the top surface 1211 of the circuit board 1209, the side surface 1213 of the circuit board 1209 and the bottom surface 1210 of the circuit board 1209. The top surface 1211 of the circuit board 1209 may be directly fixed to the flexible circuit board 1206 with double-sided pressure-sensitive adhesive tape 1212. The bottom surface 1210 of the circuit board 1209 may be connected to the third portion 1207 of the flexible circuit board 1206. The flexible circuit board 1206 at a first end is connected to the liquid crystal display 1200 and at a second end is connected to a bottom surface 1210 of the circuit board 1209. Next, a method of manufacturing the liquid crystal display device 1000 is described.

Figure 2:
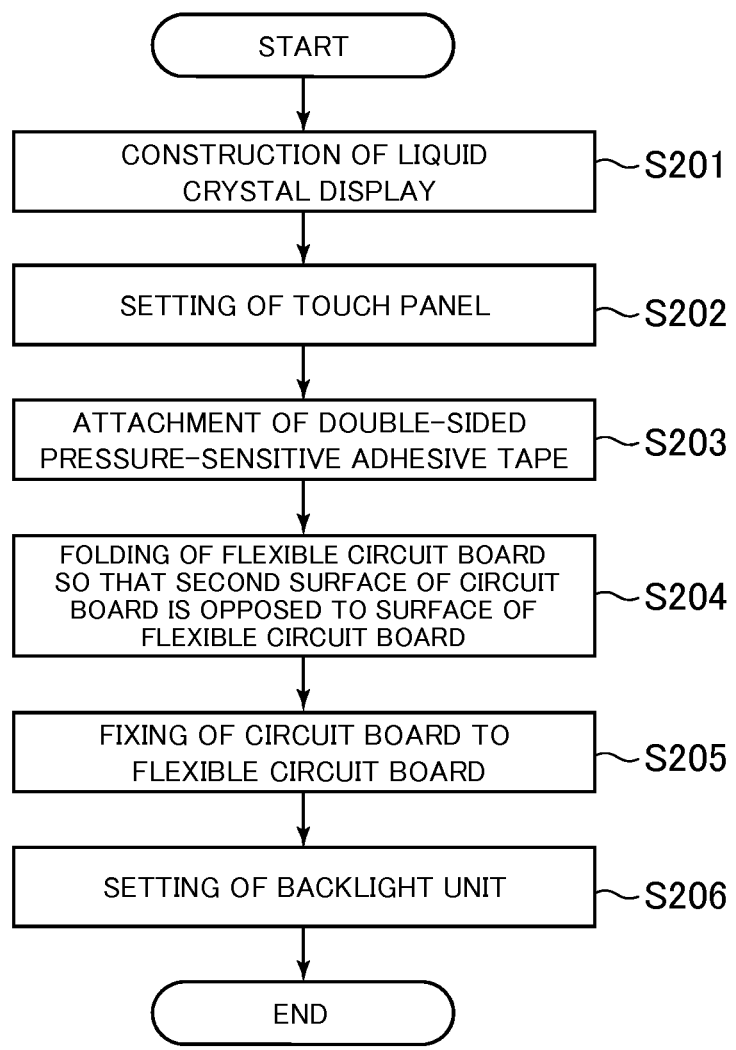
FIG. 2 illustrates an exemplary method of manufacturing the liquid crystal display device shown in FIG. 1.
Figure 3:
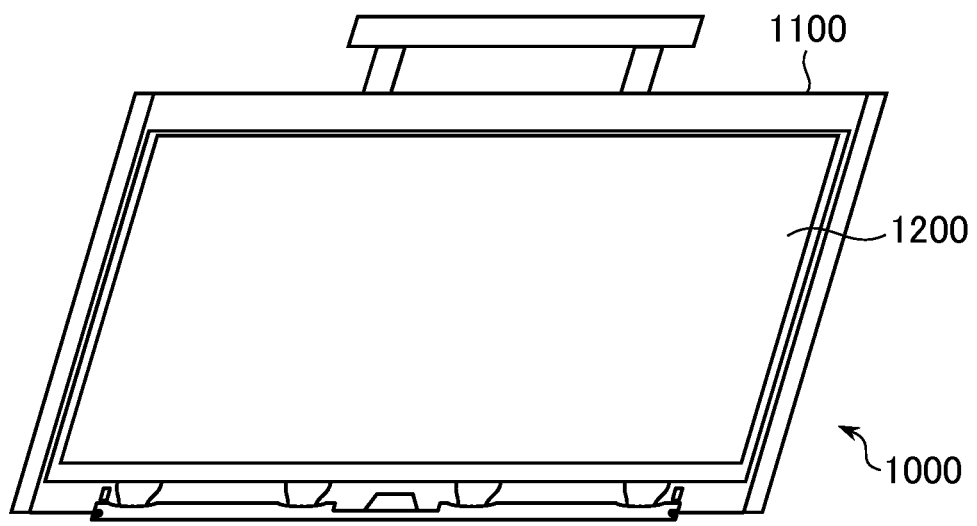
FIGS. 3-5 illustrate exemplary manufacturing processes of the liquid crystal display device shown in FIG. 1.
Figure 4:
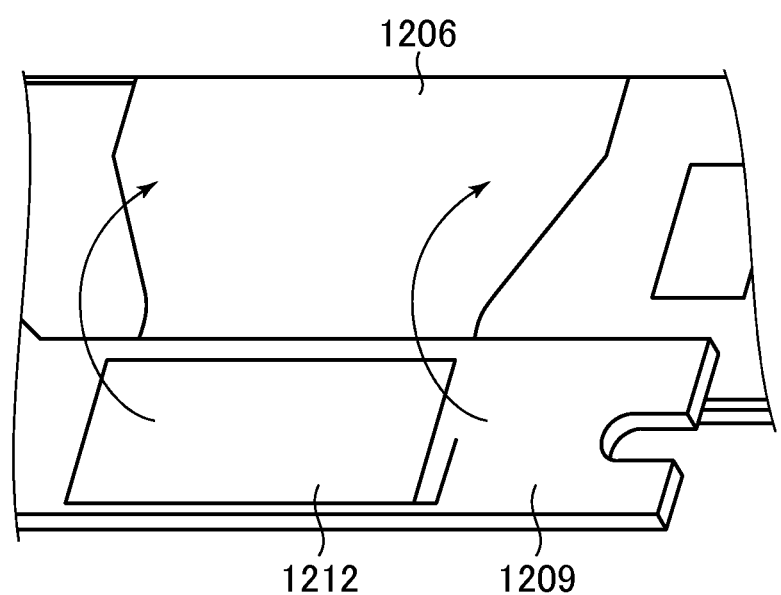
Figure 5:
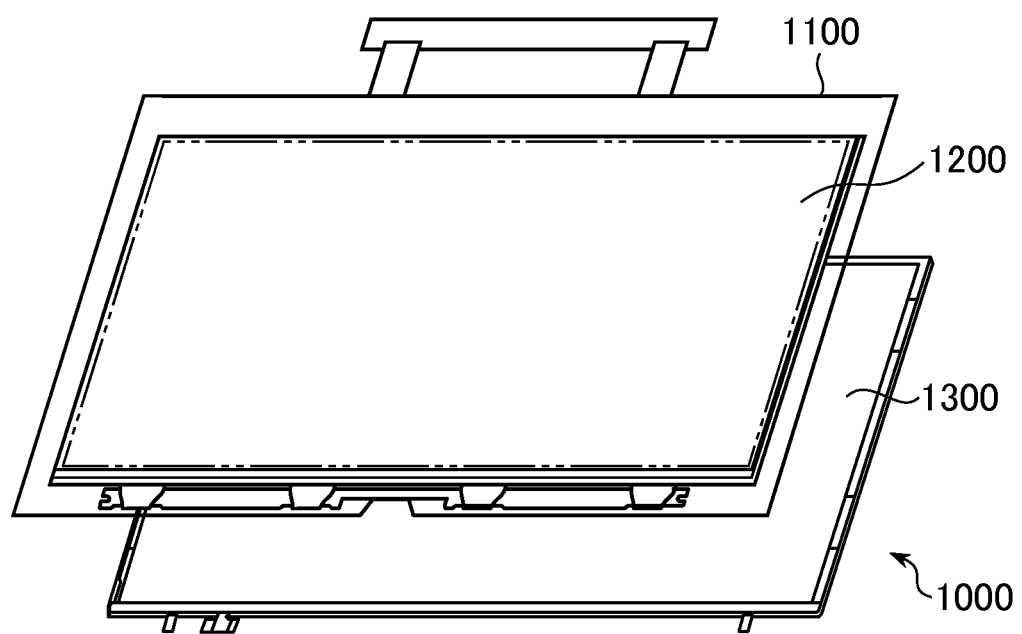

FIG. 2 illustrates an exemplary method of manufacturing the liquid crystal display device 1000 shown in FIG. 1. FIGS. 3-5 illustrate exemplary manufacturing processes of the liquid crystal display device 1000 shown in FIG. 1. Referring to FIG. 2, first, the liquid crystal display 1200 is constructed (S201). Next, the touch panel 1100 is coupled to the liquid crystal display 1200 (S202). FIG. 3 illustrates a state in which the touch panel 1100 is coupled to the liquid crystal display 1200.

Next, the double-sided pressure-sensitive adhesive tape 1212 for fixation is attached to the circuit board 1209 of the liquid crystal display 1200 (S203). FIG. 4 illustrates a state in which the double-sided pressure-sensitive adhesive tape 1212 is attached to the circuit board 1209. Then, as indicated by the arrows of FIG. 4, the flexible circuit board 1206 of the liquid crystal display 1200 is folded so that the top surface 1211 of the circuit board 1209 is opposed to the surface of the flexible circuit board 1206 (S204). Next, with use of the double-sided pressure-sensitive adhesive tape 1212 attached in Step S203, the top surface 1211 of the circuit board 1209 is directly fixed to the flexible circuit board 1206 (S205).

Next, the backlight unit 1300 is coupled to the liquid crystal display 1200 (S206). FIG. 5 illustrates a step of coupling the backlight unit 1300 to the liquid crystal display 1200. The backlight unit 1300 is provided on surface of the liquid crystal display 1200 located opposite to the display surface of the liquid crystal display 1200. In this way, manufacturing method of the liquid crystal display device 1000 can be completed. To this end, the liquid crystal display device 1000 includes the circuit board 1209 that is fixed to the flexible circuit board 1206 without using the backlight unit 1300.

Figure 6:
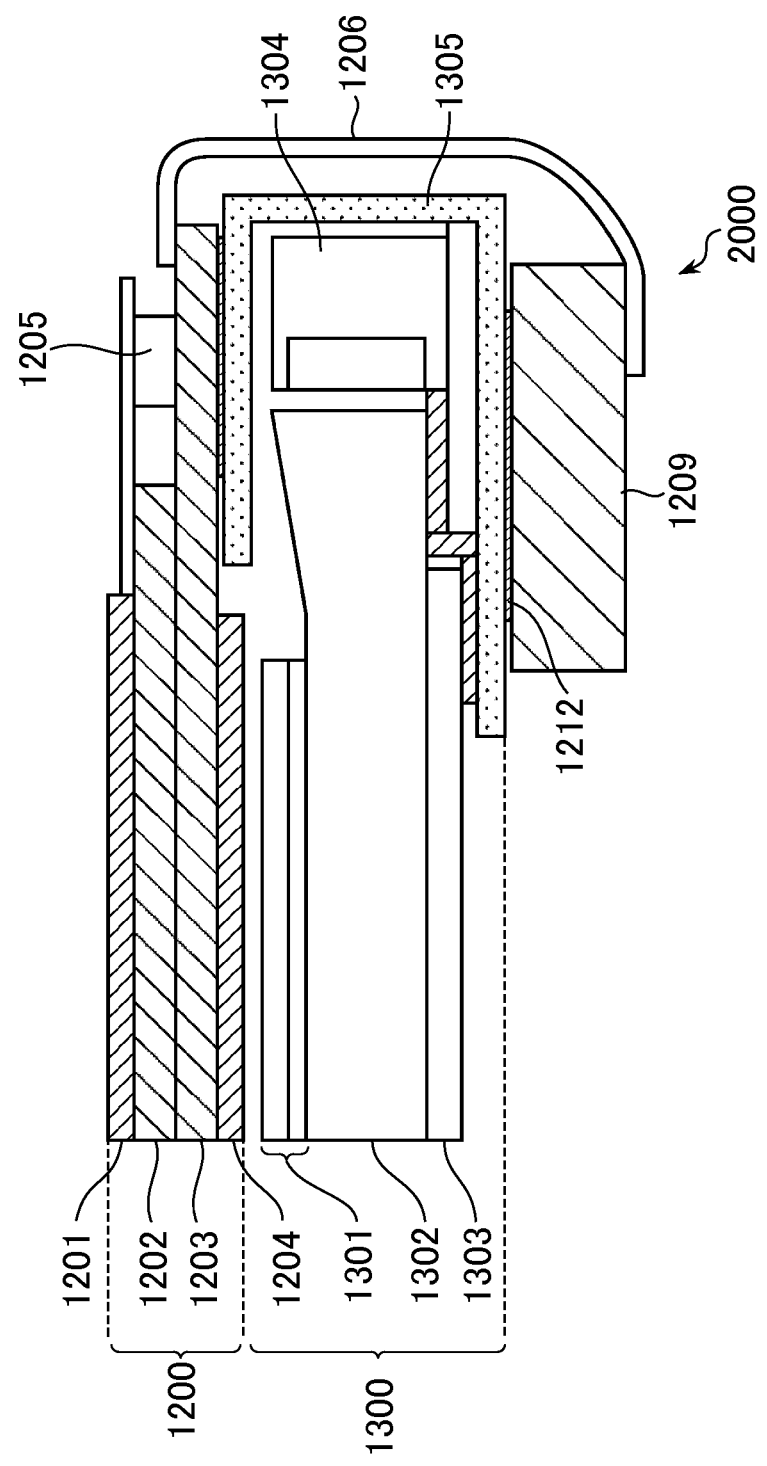
FIG. 6 illustrates an exemplary configuration of a liquid crystal display device without a touch panel.
Figure 7:
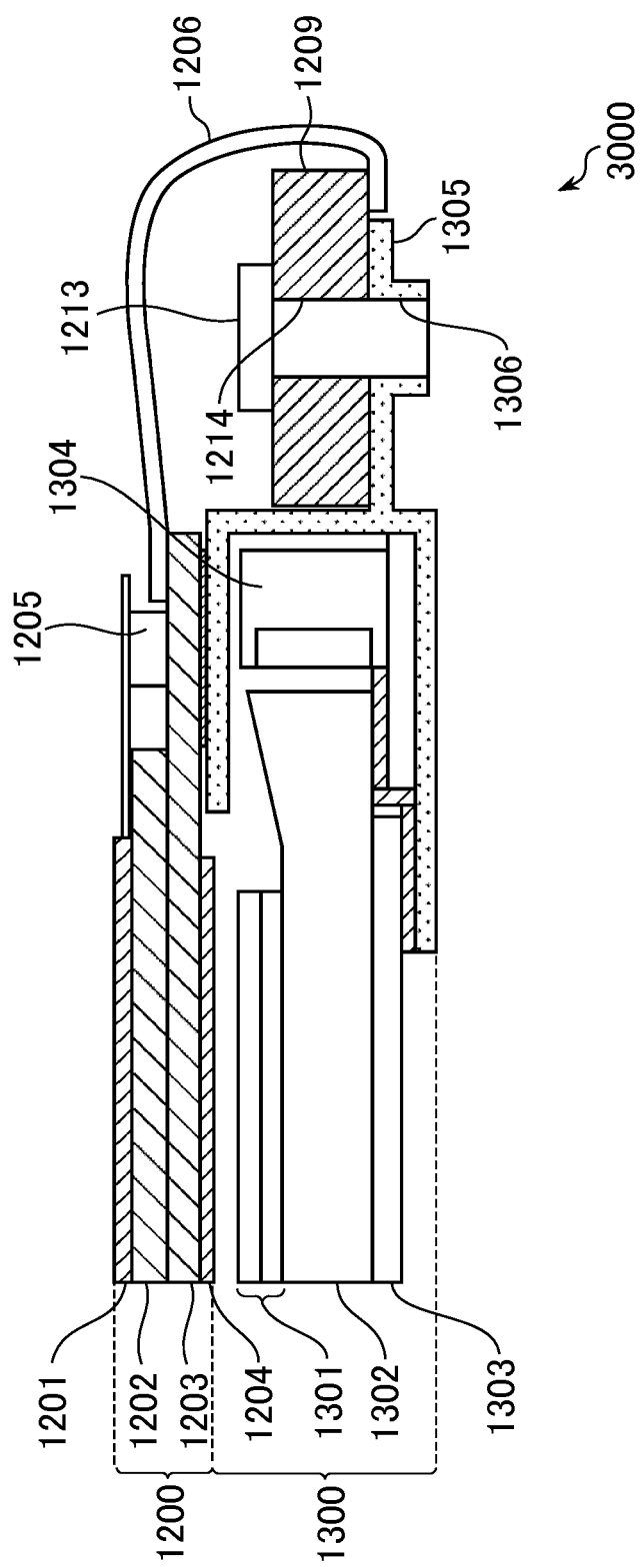
FIG. 7 illustrates another exemplary configuration of a liquid crystal display device without a touch panel.

FIG. 6 illustrates an exemplary configuration of a liquid crystal display device 2000 without a touch panel. FIG. 7 illustrates another exemplary configuration of a liquid crystal display device 3000 without a touch panel. In applications taking priority in downsizing (area saving), as illustrated in FIG. 6, the circuit board 1209 is fixed to a part of the frame 1305 of the backlight unit 1300 on the opposite side to the liquid crystal display 1200 with use of the double-sided pressure-sensitive adhesive tape 1212 or the like. In this case, the thickness is increased by the thickness of the circuit board, but the outer shape of the liquid crystal display device can be reduced. On the other hand, in applications taking priority in thinning, as illustrated in FIG. 7, the circuit board 1209 is fixed to a part of the frame 1305 of the backlight unit 1300, which is protruded in the side surface direction of the liquid crystal display 1200, with use of a screw 1213. Therefore, the outer shape is increased on the protruded part, but the thickness of the liquid crystal display device can be reduced.

However, in the configuration for applications taking priority in thinning illustrated in FIG. 7, the position of the circuit board 1209 is determined based on the bending of the flexible circuit board 1206, and hence it is difficult to align a screw hole 1214 of the circuit board 1209 with a screw hole 1306 of the frame 1305.

When the touch panel 1100 is further provided, it is difficult to fix the circuit board 1209 to the part of the frame 1305 of the backlight unit 1300, which is protruded in the side surface direction of the liquid crystal display 1200, with use of the screw 1213 as illustrated in FIG. 7. This point is described below.

Figure 8:
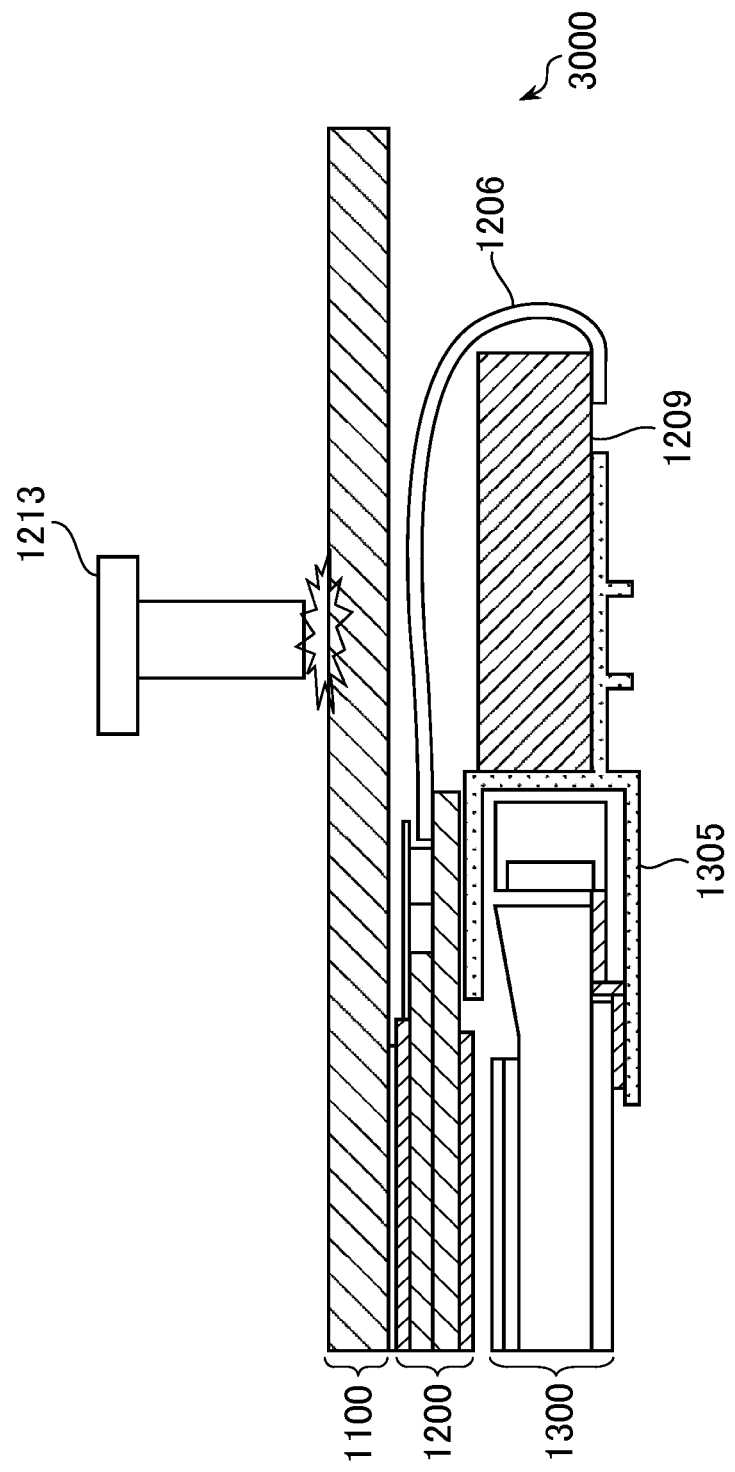
FIGS. 8-10 illustrate exemplary manufacturing steps of the liquid crystal display device including a touch panel.
Figure 9:
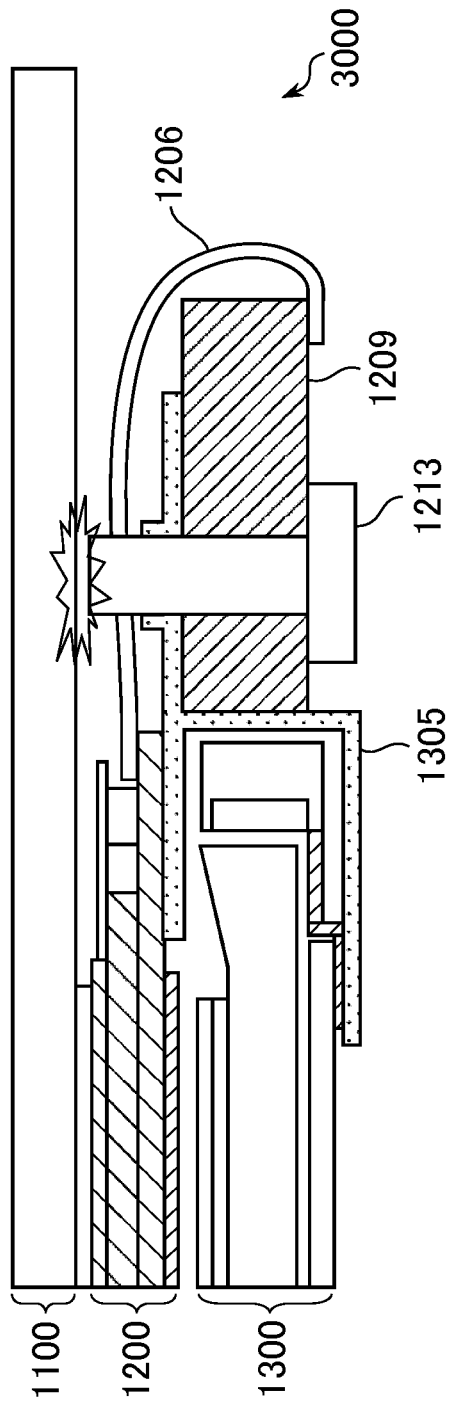
Figure 10:
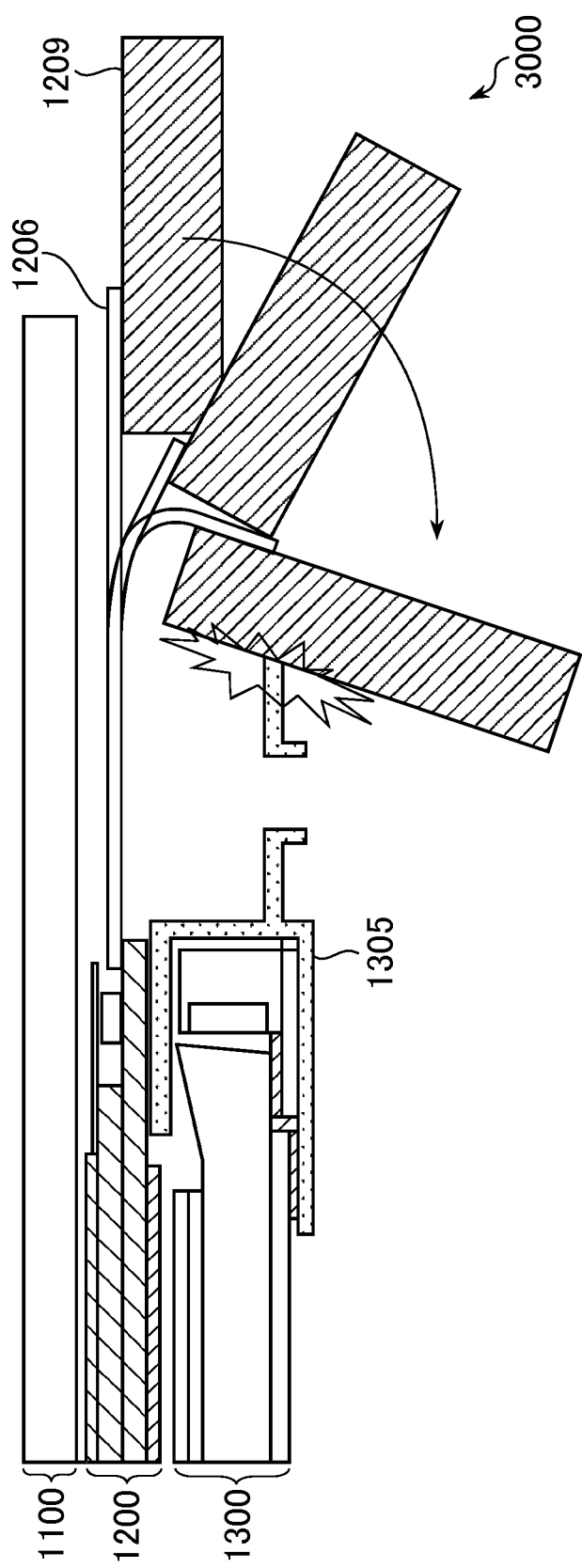

FIGS. 8-10 illustrate exemplary manufacturing steps of the liquid crystal display 3000 device including a touch panel 1100. The surface of the liquid crystal display 1200 may be flat when the touch panel 1100 is attached thereto. The touch panel 1100 may be attached to the liquid crystal display device 3000 before mounting the backlight unit 1300. Therefore, when the circuit board 1209 is fixed with use of the frame 1305 of the backlight unit 1300, the fixing is carried out under a state in which the touch panel 1100 has been already set. However, the touch panel 1100 has an area larger than that of the display surface of the liquid crystal display 1200, and hence, unlike FIG. 7, it may be impossible to perform screwing from the upward direction as shown in FIG. 8. Furthermore, when screwing is performed from the downward direction as shown in FIG. 9, the touch panel 1100 may be damaged. This is because an interval from a position of the frame 1305, which is closest to the touch panel 1100, to the touch panel 1100 may be as small as 1 mm or less. In addition, in this scenario, it may be difficult to bend the flexible circuit board 1206 into a shape as illustrated in FIG. 8. When the flexible circuit board 1206 is bent into a shape as illustrated in FIG. 8, in order to insert the circuit board 1209 between the flexible circuit board 1206 and the frame 1305, it is necessary to once warp the flexible circuit board 1206 in the upward direction of the figure. However, the touch panel 1100 is present in the upward direction, and hence the flexible circuit board 1206 cannot be sufficiently warped. As shown in FIG. 10, the flexible circuit board 1206 also cannot be sufficiently wrapped in the downward direction. Therefore, the circuit board 1209 cannot be inserted between the flexible circuit board 1206 and the frame 1305 as shown in FIG. 10. Further, when the flexible circuit board 1206 is warped upward, the touch panel 1100 may be damaged.

As a countermeasure, in one implementation, the circuit board 1209 of the instant application may be directly fixed to the flexible circuit board 1206 with the double-sided pressure-sensitive adhesive tape 1212. Therefore, adjustment of the position of the screw hole may be unnecessary, and the accuracy that is required for the bending shape in the manufacturing steps can be reduced. Since the screw 1213 is not used, the touch panel 1100 may not be damaged by the screw 1213 as shown in FIGS. 8 and 9. Furthermore, the flexible circuit board 1206 may only be required to be bent in the downward direction of the figure, thereby avoiding damage to the touch panel 1100, which would have been caused in bending the flexible circuit board 1206 in the upward direction.

Although in the above-described implementation the circuit board 1209 is fixed to the flexible circuit board 1206 with the double-sided pressure-sensitive adhesive tape 1212, the instant application is not limited thereto. For example, the circuit board 1209 may be fixed to the flexible circuit board 1206 with single-sided pressure-sensitive adhesive tape, solder, a clip, or the like.

Figure 11:
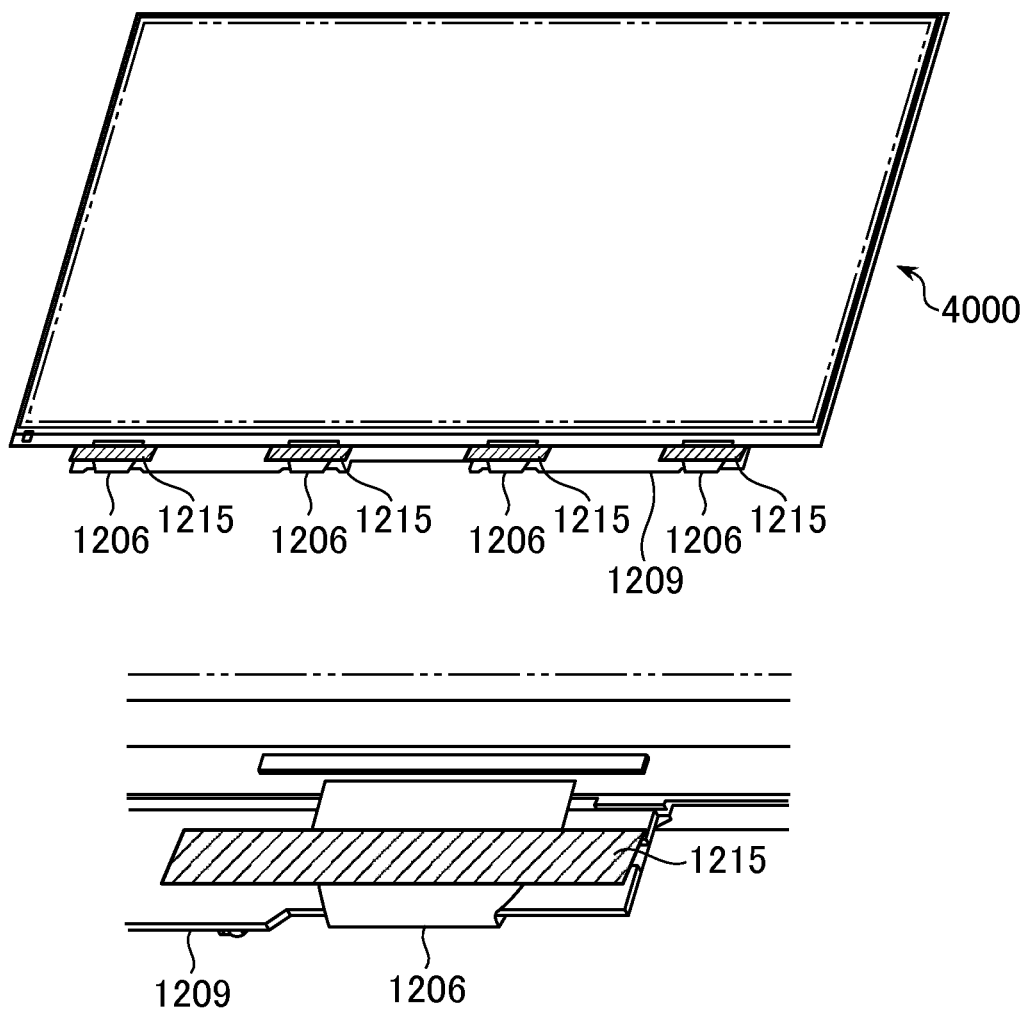
FIG. 11 illustrates a liquid crystal display device in which a circuit board is fixed to a flexible circuit board with single-sided pressure-sensitive adhesive tape.
Figure 12:
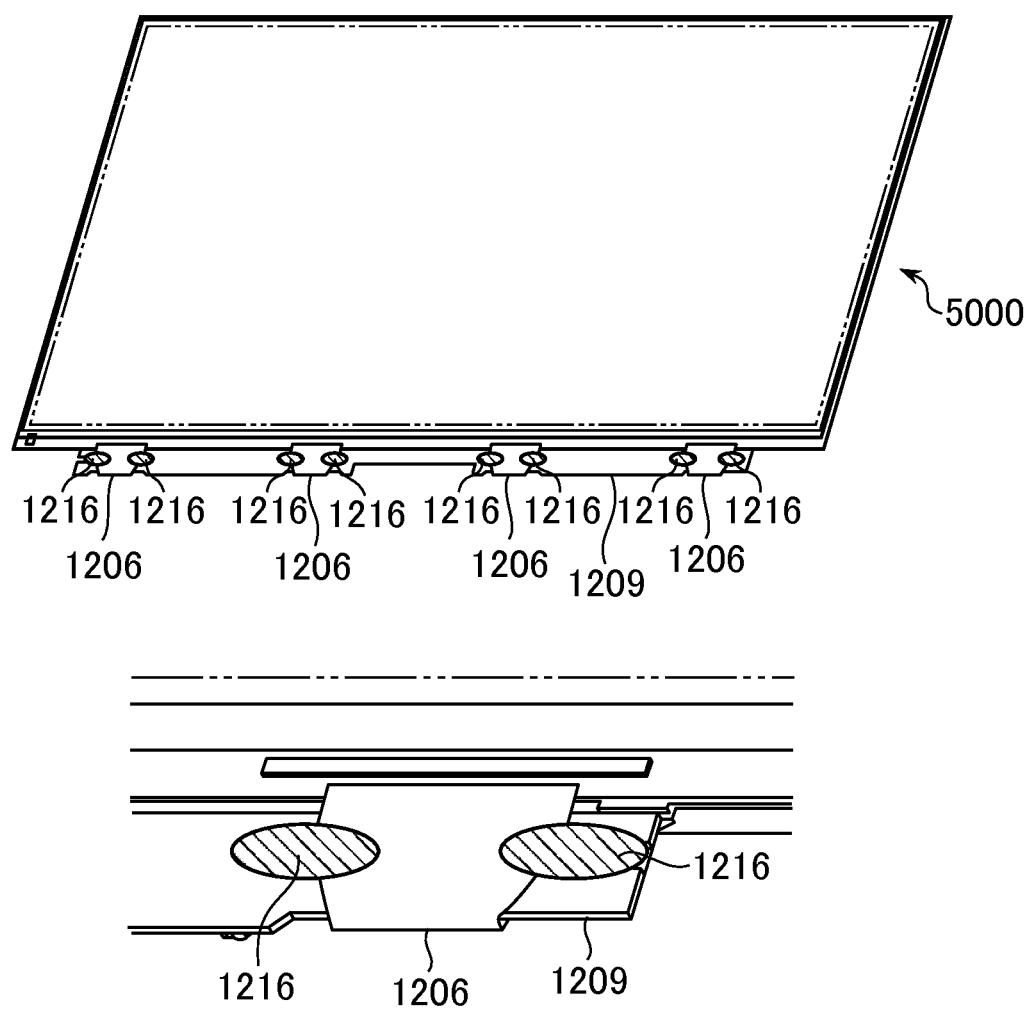
FIG. 12 illustrates a liquid crystal display device in which the circuit board is fixed to the flexible circuit board with solder.
Figure 13:
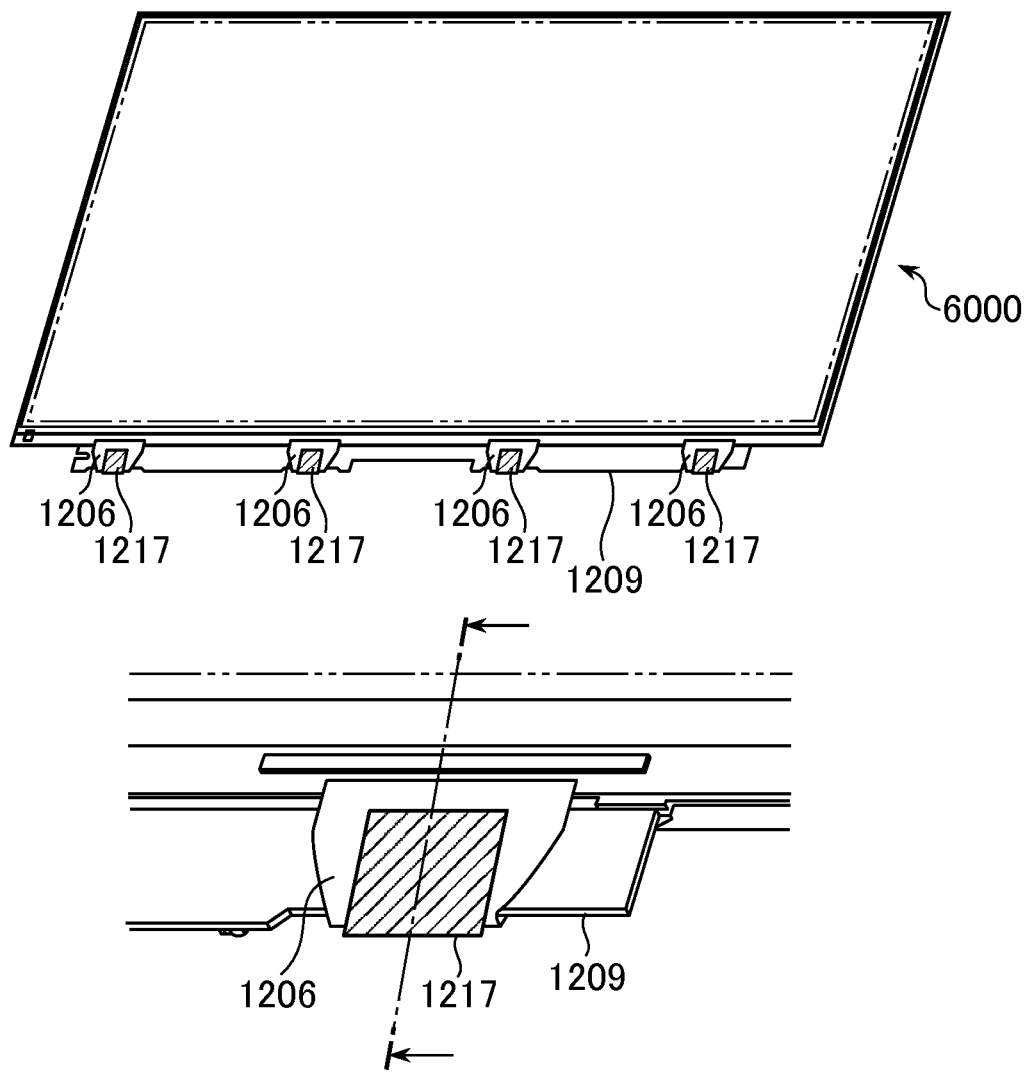
FIG. 13 illustrates a liquid crystal display device in which the circuit board is fixed to the flexible circuit board with a clip.
Figure 14:
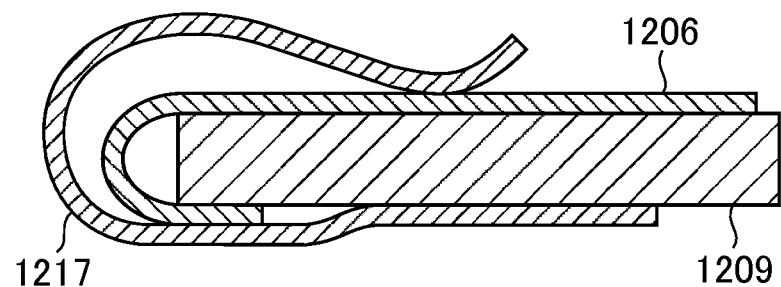
FIG. 14 illustrates a sectional view of the liquid crystal display device shown in FIG. 13.

FIG. 11 illustrates a liquid crystal display device 4000 in which a circuit board 1209 is fixed to a flexible circuit board 1206 with single-sided pressure-sensitive adhesive tape 1215. FIG. 12 illustrates a liquid crystal display device 5000 in which the circuit board 1209 is fixed to the flexible circuit board 1206 with solder 1216. FIG. 13 illustrates a liquid crystal display device 6000 in which the circuit board 1209 is fixed to the flexible circuit board 1206 with a clip 1207. FIG. 14 illustrates a sectional view of the liquid crystal display device 6000, which is taken along the dashed-dotted line of FIG. 13.

Referring again to FIG. 1, the top surface 1211 of the circuit board 1209 is shown to be fixed to the flexible circuit board 1206 in the liquid crystal display device, the instant application is not limited thereto. For example, the side surface of the circuit board 1209 may be fixed to an opposed region (bent region) of the surface of the flexible circuit board 1206. Furthermore, in order to fix the circuit board 1209 without a backlash, it is desired that the interval d of FIG. 1 between the circuit board 1209 and the liquid crystal display 1200 be set to a desired value or less. The desired value may be determined based on the hardness of the flexible circuit board 1206. Alternatively or additionally, the desired value may be determined so that the circuit board 1209 comes into contact with the frame 1305. The value of d may be more than 0 mm and 1.5 mm or less. When the interval is provided, disconnection is less likely to occur as compared to the case where no interval is provided (e.g., d=0).

Figure 15:
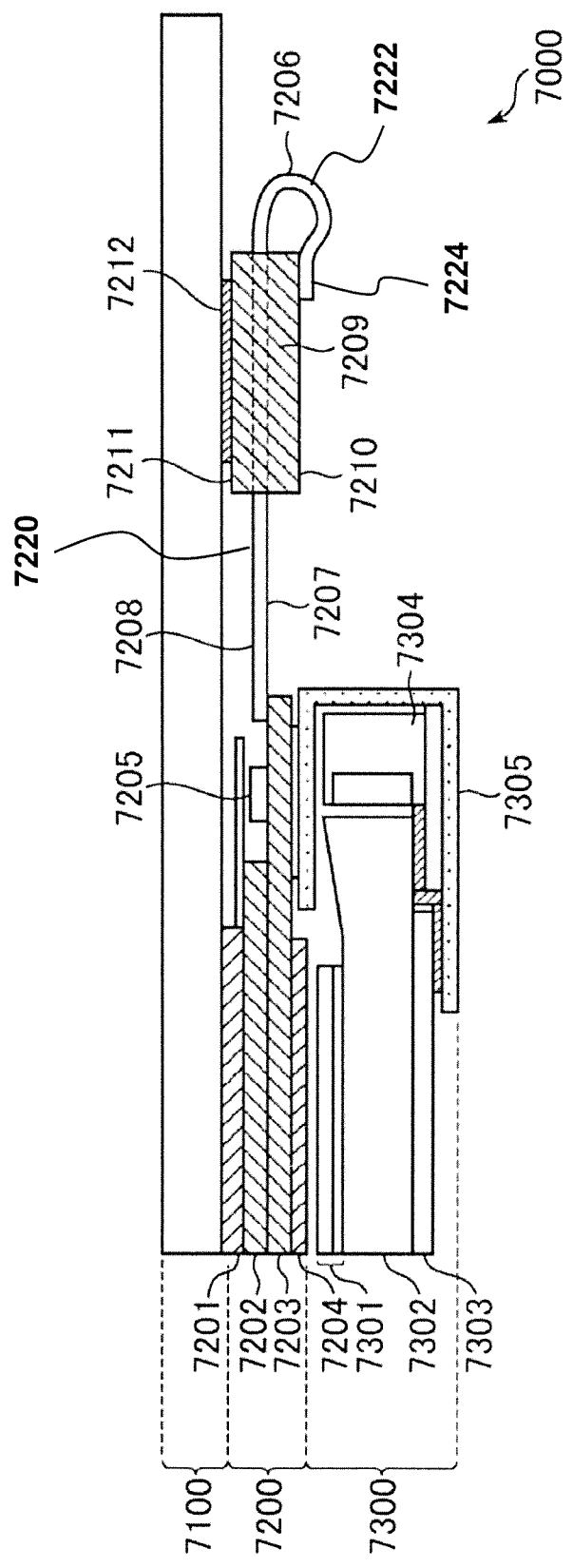
FIG. 15 illustrates another exemplary configuration of a liquid crystal display device of the present invention.

FIG. 15 illustrates another exemplary configuration of a liquid crystal display device 7000 of the present invention. The liquid crystal display device 7000 includes a touch panel 7100, a liquid crystal display 7200, and a backlight unit 7300. The touch panel 7100 is a touch panel provided to cover a display surface of the liquid crystal display 7200, and detects user's contact (touch operation) to the surface of the touch panel 7100, which is performed in accordance with the display of the liquid crystal display 7200. Based on the detection result, the touch panel 7100 generates an electrical signal, and outputs the generated electrical signal to a control section (not shown) or the like of the liquid crystal display device 7000.

The liquid crystal display 7200 includes polarizing plates 7201 and 7204, color filter glass 7202, a TFT substrate 7203, and a driver IC 7205. The driver IC 7205 is provided on the TFT substrate 7203. Examples of a method of mounting the driver IC include COF and COG COF refers to mounting of a chip of the driver IC on a thin film such as a flexible board. When COG is employed as in this implementation, a problem of disconnection may be more easily prevented and the yield may be better than the case of COF.

The backlight unit 7300 includes an optical sheet 7301, a light guide plate 7302, a reflective sheet 7303, a light source 7304, and a frame 7305 made of iron or aluminum. The backlight unit 7300 is provided on a surface of the liquid crystal display 7200 located on an opposite side to a display surface of liquid crystal display 7200, on which the touch panel 7100 is provided.

The liquid crystal display 7200 and a circuit board 7209 including a drive circuit for driving the liquid crystal display 7200 are connected to each other via a flexible circuit board 7206. In this case, a first end of the flexible circuit board 7206 is connected to the liquid crystal display 7200, and a second end of the flexible circuit board 7206 is connected to a first surface 7210 of the circuit board 7209. The flexible circuit board 7206 has a shape of being folded. To this end, the flexible circuit board 7206 includes a first portion 7220, a second portion 7222, and a third portion 7224. The first portion 7220 extends parallel to the bottom surface of the touch panel 7100. The second portion 7222 extends from the first portion 7220 and is folded to extend away from the bottom surface of the touch panel 7100. The third portion 7224 extends from the second portion 7222 and extends parallel to the bottom surface 7210 of circuit board 7209.

Unlike the implementation shown in FIG. 1, the flexible circuit board 7206 is not placed between the top surface 7211 of the circuit board 7209 and the touch panel 7100. To this end, the top surface 7211 of the circuit board 7209 is not fixed to the flexible circuit board 7206 with double-sided pressure-sensitive adhesive tape. Instead, in FIG. 15, the top surface 7211 of the circuit board 7209 is directly fixed to the bottom surface of the touch panel 7100 with double-sided pressure-sensitive adhesive tape 7212. The bottom surface 7210 of the circuit board 7209 may be connected to the third portion 7224 of the flexible circuit board 7206. Next, a method of manufacturing the liquid crystal display device 7000 is described.

Figure 16:
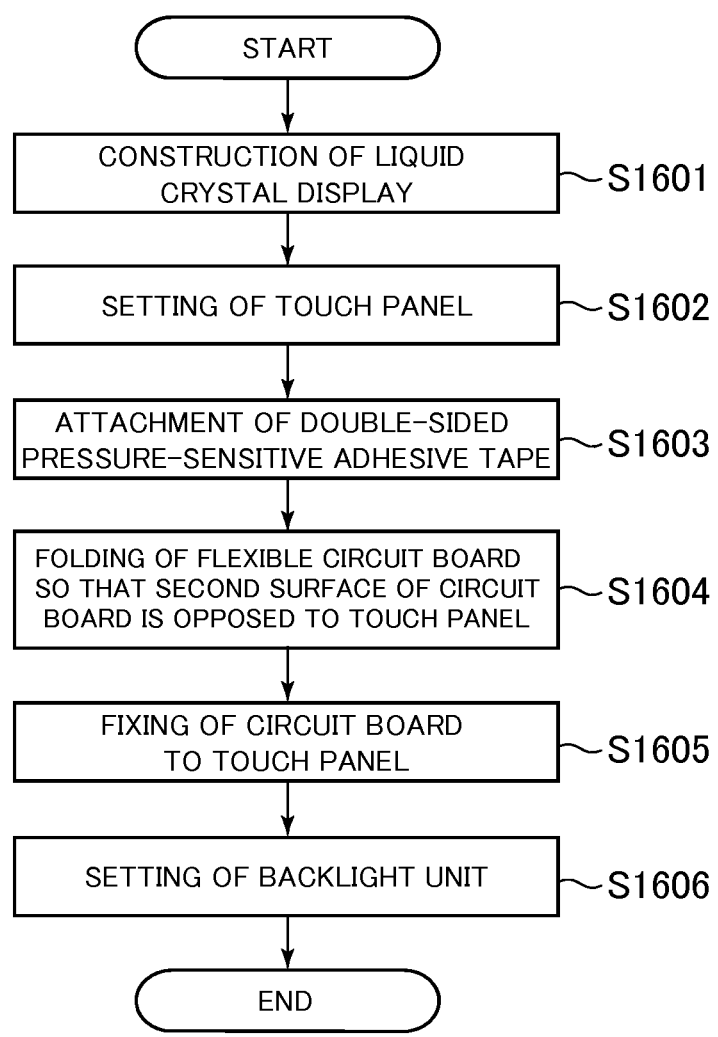
FIG. 16 illustrates an exemplary method of manufacturing the liquid crystal display device shown in FIG. 15.
Figure 17:
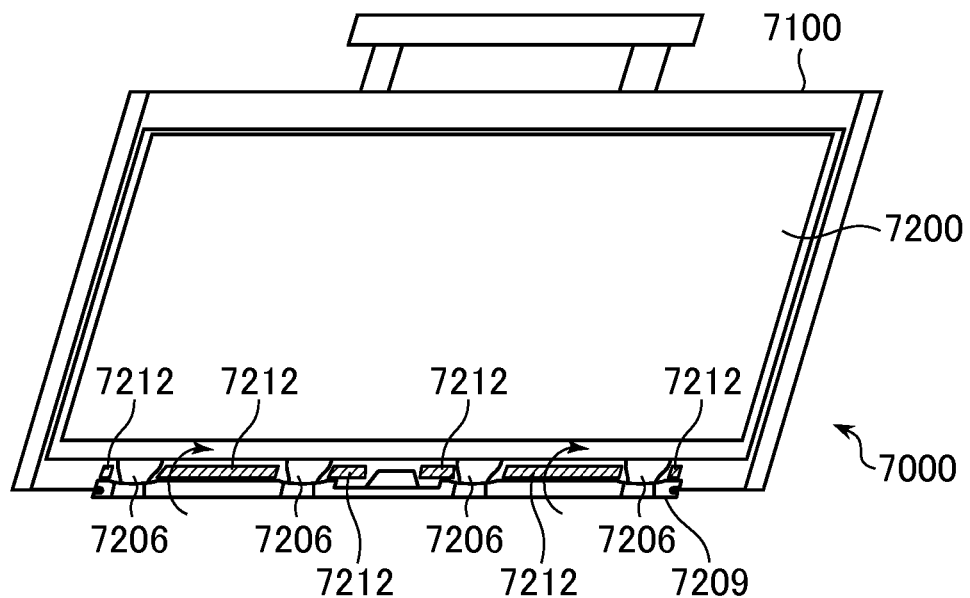
FIGS. 17-18 illustrate a manufacturing process of the liquid crystal display device shown in FIG. 15.
Figure 18:
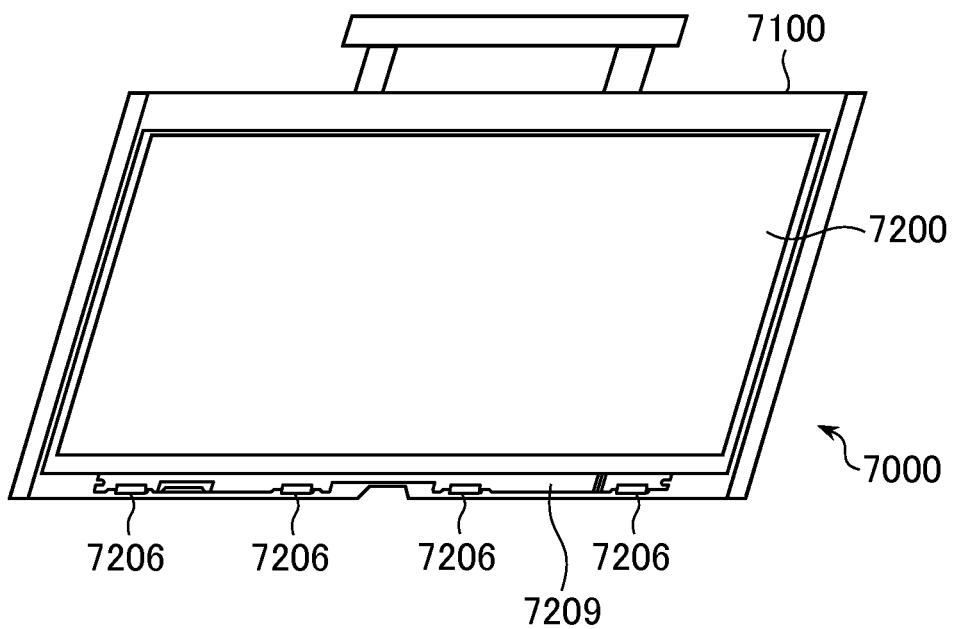

FIG. 16 illustrates an exemplary method of manufacturing the liquid crystal display device 7000 shown in FIG. 15. FIGS. 17-18 illustrate a manufacturing process of the liquid crystal display device 7000 shown in FIG. 15. First, the liquid crystal display 7200 is constructed (S1601). Next, the touch panel 7100 is coupled to the liquid crystal display 7200 (S1602). Next, the double-sided pressure-sensitive adhesive tape 7212 for fixation is attached to the touch panel 7100 (S1603). Then, the flexible circuit board 7206 of the liquid crystal display 7200 is folded so that the top surface 7211 of the circuit board 7209 is opposed to the touch panel 7100 (S1604).

FIG. 17 illustrates a step of attaching the double-sided pressure-sensitive adhesive tape 7212 to the touch panel 7100 and folding the flexible circuit board 7206. The flexible circuit board 7206 is folded so that the circuit board 7209 moves as indicated by the arrows to be opposed to the double-sided pressure-sensitive adhesive tape 7212. Next, the top surface 7211 of the circuit board 7209 is directly fixed to the touch panel 7100 with the double-sided pressure-sensitive adhesive tape 7212 attached in Step S1603 (S1605). FIG. 18 illustrates the liquid crystal display device 7000 in which the top surface 7211 of the circuit board 7209 is directly fixed to the touch panel 7100 with the double-sided pressure-sensitive adhesive tape 7212. Next, the backlight unit 7300 is coupled to the liquid crystal display 7200 (S1606). In this way, method of manufacturing the liquid crystal display device 7000 shown in FIG. 15 is completed.

With the above-mentioned configuration, the circuit board 7209 on which the drive circuit for driving the liquid crystal display 7200 is provided is fixed without using the backlight unit 7300. According to this configuration, even in the liquid crystal display device 7000 including the touch panel 7100, the circuit board 7209 is fixed. Therefore, similar to the liquid crystal display device 1000 shown in FIG. 1, the liquid crystal display device 7000 can obtain such an effect that the circuit board 7209 is fixed without damaging the touch panel 7100.

Figure 19:
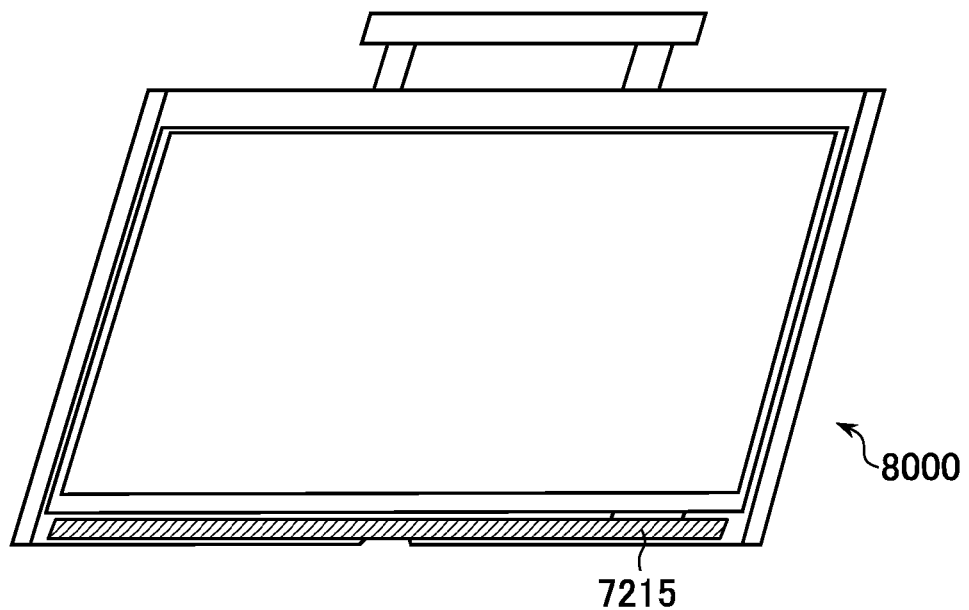
FIG. 19 illustrates a liquid crystal display device in which a circuit board is fixed with single-sided pressure-sensitive adhesive tape.

Referring again to FIG. 15, although the circuit board 7209 is fixed with the double-sided pressure-sensitive adhesive tape 7212, the present application is not limited thereto. For example, the circuit board 7209 may be fixed with single-sided pressure-sensitive adhesive tape, solder, a clip, or the like. FIG. 19 illustrates a liquid crystal display device 8000 in which the circuit board 7209 is fixed with single-sided pressure-sensitive adhesive tape 7215.

The configuration of the liquid crystal display device provided with a touch panel, in which the circuit board is fixed without using the backlight unit, is described herein, but it is needless to say that the configuration according to the present application is applicable to a liquid crystal display device not provided with a touch panel.

What is claimed is:
1. A liquid crystal display device comprising:
a liquid crystal display;
a circuit board including a drive circuit for driving the liquid crystal display;
a flexible circuit board for connecting the liquid crystal display and the circuit board to each other; and
a touch panel provided to cover a display surface of the liquid crystal display, wherein:
the flexible circuit board has a first end connected to the liquid crystal display and a second end connected to the circuit board,
the touch panel has a protruding portion protruding from the liquid crystal display in plan view,
the circuit board is fixed to a bottom surface of the protruding portion of the touch panel, and the flexible circuit board includes:
- a first portion extending from the first end along a bottom surface of the touch panel,
- a second portion extending from the first portion and being folded away from the bottom surface of the touch panel, and
- a third portion extending from the second portion toward the second end along a bottom surface of the circuit board.

2. The liquid crystal display device according to claim 1, wherein the circuit board is fixed to a bottom surface of the touch panel by an adhesive tape.

3. The liquid crystal display device according to claim 1, wherein a plurality of flexible circuit boards, each of which is the flexible circuit board, are arranged so as to be apart from each other.

4. The liquid crystal display device according to claim 1, wherein the bottom surface of the protruding portion of the touch panel is opposed to the liquid crystal display.

* * * * *